(No Model.)

C. S. BATES.
CAR AXLE.

No. 361,391. Patented Apr. 19, 1887.

Witnesses.
C. E. Sundgren
Henry J. McBride

Inventor:
Chester S. Bates
by his attys
Brown & Hall

UNITED STATES PATENT OFFICE.

CHESTER S. BATES, OF SARATOGA SPRINGS, NEW YORK.

CAR-AXLE.

SPECIFICATION forming part of Letters Patent No. 361,391, dated April 19, 1887.

Application filed August 14, 1886. Serial No. 210,865. (No model.)

*To all whom it may concern:*

Be it known that I, CHESTER S. BATES, of Saratoga Springs, in the county of Saratoga and State of New York, have invented a new and useful Improvement in Car-Axles, of which the following is a specification.

My invention is applicable to the axles of railway-cars, street-cars, and may be also embodied in locomotives and other vehicles which run upon track-rails. Where axles are made of one piece from end to end and the wheels, which are fast upon the axle, are thus prevented from turning independently of each other, one wheel must always slip or slide upon the track-rail in rounding curves in a track, and, in order to obviate such slipping or sliding of the wheel or wheels, axles have been made of two parts, on each of which a wheel is fast, and which are so connected that one wheel and its axle portion may turn independently of the other wheel and its axle portion. It is to this class of axles, which are formed in two parts or divided at the center, that my invention relates; and the object of my invention is to provide a very secure means of connecting the two axle portions so that no part or device employed in making the connection can ever be lost.

The invention consists in the combination, with a divided car-axle having circumferential grooves near the adjacent ends of its two portions, of a sleeve receiving within it the two axle portions, keys or securing devices inserted transversely through the sleeve and entering said grooves and having their ends sheathed within the outer surface of the sleeve, and a second sleeve fitting outside the first and covering the keys or securing devices. In the above combination the keys or securing devices are preferably straight and tangential to a circle slightly smaller than the axle portions, and are inserted through the inner sleeve and enter the grooves in the axle.

Figure 1:
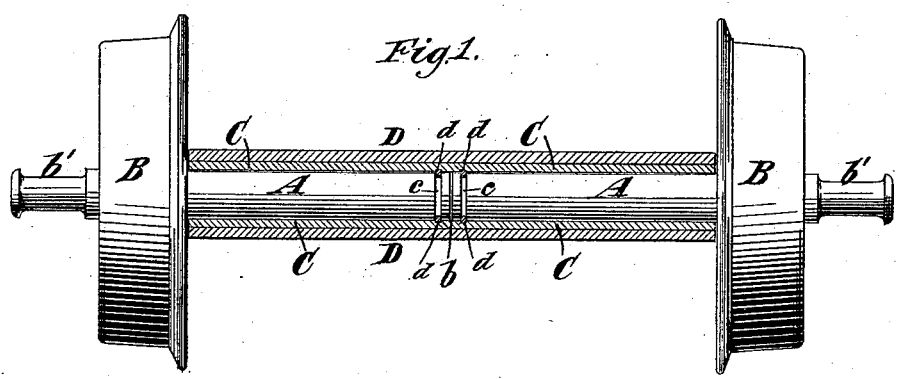
Figure 2:
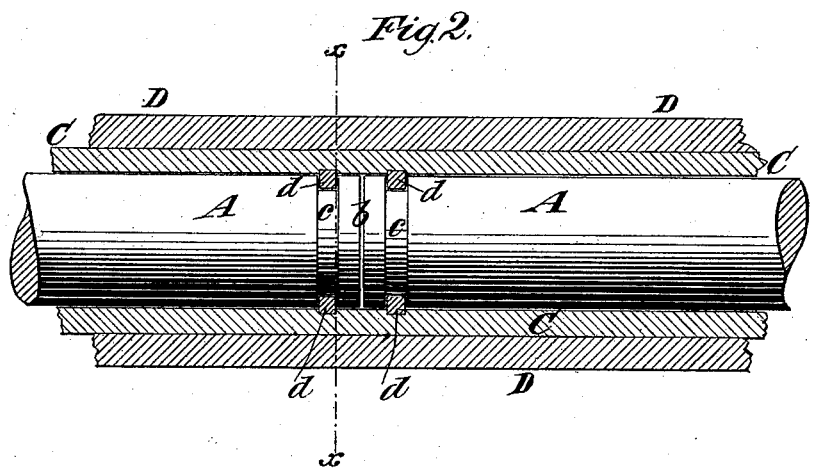
Figure 3:
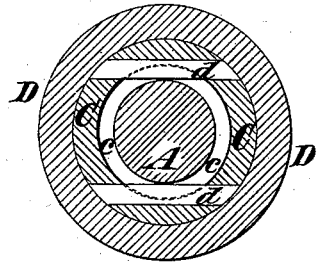

In the accompanying drawings, Figure 1 is a longitudinal section through the inner and outer sleeves surrounding a divided axle, and a side view of the two axle portions with the wheels thereon. Fig. 2 is a section, similar to Fig. 1, of a central portion of the entire axle upon a very much larger scale; and Fig. 3 is a transverse section on the plane of the dotted line *x x*, Fig. 2, and upon the same scale.

Similar letters of reference designate corresponding parts in the several figures.

A A designate the two axle portions, which are in line and meet at about the point *b*, and on each of which is secured a wheel, B. In this example of my invention the axle portions are prolonged beyond the wheels B, so as to form the journals *b'*.

In the axle portions A, near their meeting ends, are formed circumferential grooves *c*, which may be of any suitable depth. I have here shown only one groove *c* in each axle portion A; but two or more grooves and a corresponding number of keys or securing devices may be employed for each axle portion.

C designates an inner sleeve, which surrounds and receives within it the two axle portions A, and which will usually extend from one wheel to the other, as here shown.

D designates still another or outer sleeve, which surrounds the sleeve C and also, as here shown, extends from one wheel to the other; but this outer sleeve may be of less length than the inner sleeve, if desired, and may extend only for a short distance in both directions beyond the meeting-joint *b* between the axle portions.

The inner surface of the inner sleeve, C, should be bored so as to accurately fit the axle portions A throughout the whole of their length, or at isolated points in their length, and the axle portions A should be free to turn in the sleeve when rounding curves; but on a straight track the sleeve C will turn synchronously with both axle portions A, and there will be no friction between the axle portions and the sleeve.

Through the sleeve C securing devices are inserted transversely to the length of the sleeve and enter the circumferential grooves *c* formed in the two axle portions A. As here represented, these securing devices consist of keys *d*, inserted transversely through the sleeve C in such position that they are approximately tangential to the bottom of the grooves *c* formed in the axle portions, as will be best understood from Fig. 3. These keys *d* have a very secure hold in the circumferential grooves *c*, and are supported at each end in the sleeve C, and hence form a very effective means of preventing the axle portions A from separating and allowing the wheels to spread. The keys *d* are of such length that their ends are sheathed within or flush with the outer surface of the inner sleeve, C, and the outer sleeve, D, serves to cover the keys $d$ or other securing devices, and absolutely prevent their accidental displacement. The outer sleeve, D, may be forced upon the inner sleeve sufficiently tight to hold it in place thereon; or, if it extends the entire distance from wheel to wheel, it may fit upon the sleeve C comparatively loosely.

I have here shown keys $d$ inserted in pairs, one on each side of the axle portions A, and engaging the grooves $c$ at diametrically-opposite points, and in this manner the sleeve C and keys $d$ constitute a very secure and durable means of connecting the two axle portions A.

What I claim as my invention, and desire to secure by Letters Patent, is—

1. The combination, with a divided car-axle having circumferential grooves near the adjacent ends of its two portions, of a sleeve receiving within it the two axle portions, keys or securing devices inserted transversely through the sleeve and entering said grooves and having their ends sheathed within the outer surface of the sleeve, and a second sleeve fitting outside the first and covering the keys or securing devices, substantially as herein described.

2. The combination, with the axle portions A, provided with circumferential grooves $c$, of the inner sleeve, C, the tangential keys $d$, inserted through the sleeve and entering the said grooves, and the outer sleeve, D, covering the keys and securing them in place, substantially as herein described.

CHESTER S. BATES.

Witnesses:
JOHN J. VIRTU,
FELIX THOMAS.